S. A. Bailey,
Wringer Roll.
Nº 35,663. Patented June 24, 1862.
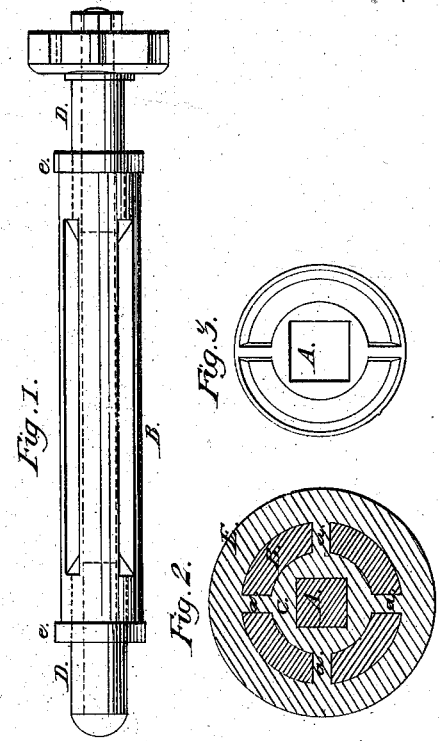
Inventor:
S. A. Bailey
Witnesses:
Charles Alexander
C. M. Alexander

UNITED STATES PATENT OFFICE.

S. A. BAILEY, OF NEW LONDON, CONNECTICUT.

IMPROVED ROLLERS FOR WRINGING-MACHINES.

Specification forming part of Letters Patent No. 35,663, dated June 24, 1862.

*To all whom it may concern:*

Be it known that I, S. A. BAILEY, of New London, Connecticut, have invented certain new and useful Improvements in Cylinders for Wringing-Machines; and I do hereby declare that the following is a full, clear, and exact description of the same, reference being had to the accompanying drawings, and to the letters of reference marked thereon.

In the annexed drawings, making part of this specification, A represents a square wrought-iron shaft, which has slipped over it at each end a cast-iron sleeve, D. The outer ends of the sleeves answer as journals or bearings for the shaft.

B represents a wooden cylinder, which is passed over the shaft A before the sleeves are put on. The hollow of this cylinder is made larger than the diameter of the shaft, as is shown in Figure 2. Slots or openings are made longitudinally of this cylinder, commencing near one end and ending about the same distance from the other end. When these openings are cut, a series of spring-slats are thus formed, which yield readily at their centers when pressure is put upon them. These openings and the space between the cylinder and the shaft are filled with india-rubber. The outside of the cylinder is also covered with rubber. The rubber is wrapped around the cylinder and then submitted to heat enough to fuse it and run it in mass around the shaft and cylinder and in the interstices or openings in the cylinder.

It will be readily perceived that when the rubber is put on in this way there is rubber between the slats and the shaft to support them, and that the outside rubber and the inside rubber are connected through the openings, as at *a a*, Fig. 2. The inner ends of the sleeves D D fit in the ends of the cylinder B, and lugs in the collar *e* upon said sleeves fit in notches cut in the ends of the cylinder, and thus prevent its turning upon the shaft. The object of this arrangement and construction is to make an elastic rubber cylinder for wringing-machines in such a way that the rubber will not turn and become displaced when heavy pressure is put upon it in using the machines in washing and wringing clothes.

I do not confine myself to a square shaft, nor to a sleeve with a square hole through it to fit upon said shaft, as I may use a round shaft and secure the sleeve upon it in any of the well-known ways.

I may use, instead of a cylinder and shaft, simply a pipe of metal with openings through it, as in the wooden cylinder here used, and then fill it and its interstices with rubber in the manner herein set forth.

Having thus fully described my invention, what I claim as new, and desire to secure by Letters Patent, is—

1. The employment of the wooden or metal cylinder B, constructed in the manner and used for the purpose specified.

2. The use of the rubber packing between the slats of the cylinder and the shaft A for the purpose of supporting said slats, as is herein fully set forth.

3. Connecting the external rubber with the rubber between the slats and the shaft through the interstices or openings in the cylinder, substantially as and for the purpose specified.

S. A. BAILEY.

Witnesses:
C. M. ALEXANDER,
CHARLES ALEXANDER.